March 6, 1934.  E. A. NELSON  1,950,259
EQUALIZING MECHANISM
Filed Oct. 2, 1931
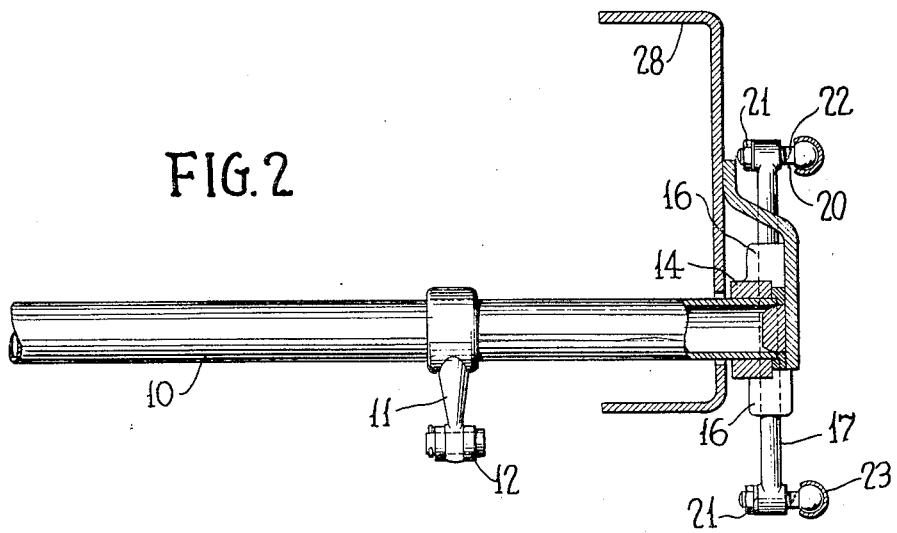
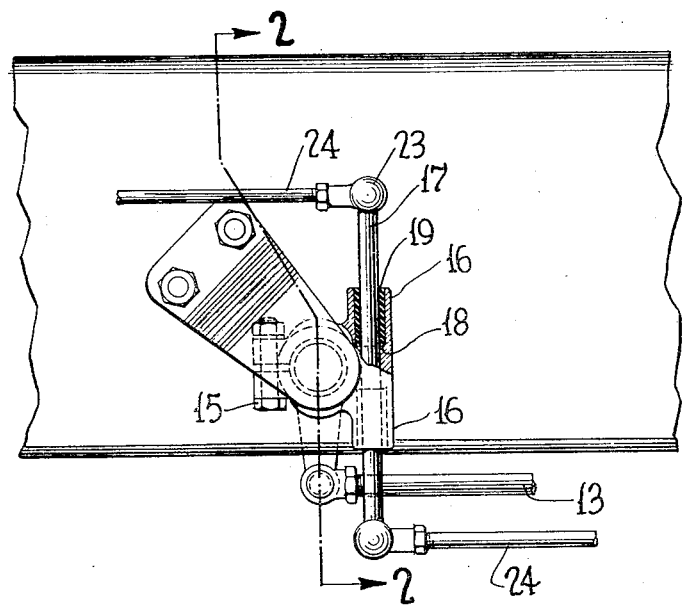
INVENTOR.
Emil A. Nelson.
BY
Harness, Dickey, Pierce & Hann
ATTORNEYS Patented Mar. 6, 1934

1,950,259

UNITED STATES PATENT OFFICE 1,950,259

EQUALIZING MECHANISM

Emil A. Nelson, Detroit, Mich.

Application October 2, 1931, Serial No. 566,514

8 Claims. (Cl. 188—204)

My invention relates to the art of brakes and more particularly to the problem of the application of equalized braking forces or braking forces having a pre-determined ratio to each other to two or more wheel brakes of a vehicle braking system.

It has been my object to devise a system of linkage interconnecting the actuating lever of a vehicle braking system with two or more brakes of that system by a comparatively simple and inexpensive arrangement affording the application of power to said two or more brakes by means affording an equalized take-up of the lost motion between the actuating lever and the respective wheel brakes and an application of the brakes with a pre-determined ratio of force. I have further sought in connection with such a system to provide means for retaining an oscillating equalizing lever in a pre-determined natural position when the brakes are unapplied and to provide further, means for rendering the automatic equalization means afforded by my system insensitive to minute impulses.

Further objects and advantages of my invention will be obvious from a reading of the subjoined specification in the light of the attached drawing in which—

Figure 1 is a side elevation of a chassis of a vehicle illustrating the application of the equalizer of my improved braking system thereto.

Figure 2 is a section on the line 2—2 of Fig. 1.

Referring to the drawing by reference characters, the numeral 10 indicates an oscillating shaft mounted between the opposite sides of the chassis frame of a vehicle. Oscillating movement is applied to this shaft by means of a lever 11 which is adjustably interconnected by means of a clevis 12 to an operating link 13. The operating link 13 is preferably connected to a foot pedal or other suitable actuating means which, upon depression, effects an oscillatory movement of the shaft 10 through the connections described. The shaft 10 passes through suitable openings in the chassis frame on opposite sides thereof and is connected beyond said openings to means affording an equalized application of braking pressure to the front and rear brakes respectively on each side of the vehicle. As the means employed to accomplish this result are identical for the two sides of the vehicle, a description of the connections upon the right hand side, as illustrated in Fig. 2, will suffice for both.

A housing 14 of split form is applied to the shaft 10 outwardly of the chassis frame member 28 and is secured to said shaft by means of a suitable clamping bolt 15. This housing is provided with opposed vertically extending hollow bosses 16 extending above and below the shaft 10, these bosses being adapted to receive a second shaft 17 which is adapted to be received within the vertically extending hollow central portion of the bosses 16 and to project an equal distance upon opposite sides thereof. The aforementioned hollow portions of the bosses are provided with shoulders 18 adapted to receive rubber sleeves 19 which afford an oscillatory joint for the shaft 17. These rubber sleeves are preferably of a conventional type now found on the market and are distorted in insertion between the shaft 17 and the hollow interior portions of the bosses 16 in order to effect a frictional bond between the rubber sleeves and the shaft and bosses respectively. Bolts 20 having ball shaped heads are adapted to be adjustably received within hollow bosses upon opposite ends of the shaft 17. The interior portions of the hollow bosses are preferably threaded in order that the bolts may be adjustably inserted to any desired depth and the bolts are secured in the desired position of adjustment by means of nuts 21 co-acting with their inner ends. These bolts are also provided with flattened portions 22 upon their shanks in order to facilitate the manipulation thereof by a suitable tool in effecting the desired adjustment. The bolts are preferably connected to the respective front and rear wheel brakes by means of ball and socket connections 23 and links 24.

In operation, when pressure is applied to the link 13, to apply the brake the shaft 10 is caused to oscillate and effect a resulting oscillation of the housing 14 therewith. The shaft 17 is thus caused to oscillate bodily about the horizontal axis 10 in the application of the brakes. During the initial stages of the brake application while the lost motion in the system between the shaft 17 and the respective wheel brakes is being taken up, there is no oscillatory movement of the shaft 17 about its own axis. When a sufficient degree of friction is developed in either of the wheel brakes by reason of the application of braking force, however, an oscillation of the shaft 17 about its own axis ensues until or unless a corresponding resistance to such movement occurs by reason of a corresponding degree of friction in the other brake to be equalized. In other words, if one of the links 24 meets a resistance to its movement due to the fact that all of the lost motion in the system has been taken up, a further oscillation of the shaft 10 will simply cause an oscillation of the shaft 17 about its own axis until the lost motion in the connection to the opposite brake on the same side of the vehicle has likewise been taken up. Furthermore, at any time when one of the wheel brakes affords less resistance than the other to the applying movement of its corresponding link 24, an oscillating movement of the shaft 17 will take place until such resistances are equalized. It will be obvious that by affording a lesser degree of lateral projection to one of the bolts 20 with respect to the shaft 17 than the other, any desired predetermined braking ratios may be obtained between the respective wheel brakes coupled by the equalizer above described. It will also be apparent that the rubber connection 19 will prevent such an extreme sensitivity on the part of the equalizer as to cause it to respond to very slight frictional forces such as those normally found in the pivotal joints of the braking system but will allow it to become immediately effective to perform its equalizing function as soon as any substantial resistance such as that incident to the actual braking function is encountered. These rubber connections are also important because of the fact that they effect a return of the shaft 17 to a pre-determined angular position upon the release of the brakes.

It will be obvious from the above that I have achieved every one of the objects of my invention. My system not only affords a delicate equalization by means of a simple and inexpensive mechanism but it affords further provision against the occurrence of an equalizing oscillation of the shaft 17 by reason of small impulses and at the same time attains the desired oscillation of the shaft 17 and connecting links to a neutral position after the application of the brakes.

Further modifications will be obvious to those skilled in the art and I do not, therefore, wish to be limited except by the generic spirit of the subjoined claims as interpreted in the light of my invention. In these claims I wish it to be understood that the term "equalization" relates to the application of more than one brake with a predetermined ratio of forces and does not necessarily imply that the forces applied to the several brakes are exactly equal.

What I claim is:

1. An equalized braking system including an actuating shaft, means for oscillating said shaft, a housing secured to said shaft, a second shaft within said housing, yieldable means connecting said second shaft and housing permitting oscillatory movement of said second shaft about an axis angularly related to the axis of oscillation of the first shaft, arms extending laterally from said second shaft, and connections from said arms to a pair of brakes.

2. An equalized braking system including an actuating shaft, means for oscillating said shaft, a housing secured to said shaft, a second shaft within said housing, yieldable means maintaining said second shaft in said housing and permitting oscillatory movement of said second shaft about an axis angularly related to the axis of oscillation of the first shaft, arms adjustably connected to said second shaft and extending laterally therefrom, and connections from said arms to a pair of brakes.

3. An equalized braking system including an actuating shaft, means for oscillating said shaft, a housing secured to said shaft, a second shaft within said housing, a yieldable sleeve connecting said second shaft and housing permitting oscillatory movement of said second shaft about an axis angularly related to the axis of oscillation of the first shaft, said second shaft having portions extending in opposite directions beyond said first shaft, arms extending laterally from said second shaft upon opposite sides of the axis of said first shaft, and connections from said arms to a pair of brakes.

4. An equalized braking system including an actuating shaft, means for oscillating said shaft, a housing secured to said shaft, a second shaft extending within said housing, a rubber bushing connecting said second shaft and housing permitting oscillatory movement of said second shaft about an axis angularly related to the axis of oscillation of the first shaft, arms adjustably connected to said second shaft from opposite sides of the axis of said first shaft and extending laterally from said second shaft, and connections from said arms to a pair of brakes.

5. An equalized braking system including an actuating shaft, means for oscillating said shaft, a housing secured to said shaft, a second shaft extending within said housing, a yieldable connection between said second shaft and housing permitting oscillatory movement of said second shaft about an axis extending substantially at right angles to the axis of oscillation of the first shaft and also permitting planular movement of said second shaft relative to said housing, arms extending laterally from said second shaft, and connections from said arms to a pair of brakes.

6. An equalized braking system including an actuating shaft, means for oscillating said shaft, a housing secured to said shaft, a second shaft extending within said housing, yieldable means connecting said second shaft and housing and normally maintaining said second shaft in a predetermined angular relationship with respect to said housing, arms extending laterally from said second shaft, and connections from said arms to a pair of brakes.

7. An equalized braking system including an actuating shaft, means for oscillating said shaft, a housing secured to said shaft, a second shaft having a rubber bonded bearing within said housing permitting oscillatory movement thereof about an axis angularly related to the axis of oscillation of the first shaft, arms extending laterally from said second shaft, and connections from said arms to a pair of brakes.

8. In a braking system, in combination, an oscillatable shaft, means for oscillating said shaft, a shaft disposed at each end of the first mentioned shaft and lying in planes approximately perpendicular to said first mentioned shaft, laterally projecting arms at each end of each of the second mentioned shafts, means connecting the free extremity of each of said laterally projecting arms with a brake mechanism, and yieldable means connecting each of said second mentioned shafts with said first mentioned shaft whereby said second mentioned shafts may oscillate about their respective axes to equalize the braking force exerted therethrough to their corresponding brakes, and may oscillate to a limited degree relative to the axis of the first mentioned shaft to equalize the braking force between the pairs of brakes connected to opposite sides of the first mentioned shaft.

EMIL A. NELSON.